US010013858B2

(12) United States Patent
Zerick et al.

(10) Patent No.: US 10,013,858 B2
(45) Date of Patent: Jul. 3, 2018

(54) NOTIFICATION SYSTEM WITH HAPTIC FEEDBACK GARMENT AND METHODS FOR USE THEREWITH

(71) Applicant: AT&T Intellectual Property I, L.P., Atlanta, GA (US)

(72) Inventors: Juliette Niebuhr Zerick, Alpharetta, GA (US); William Charles Cottrill, Canton, GA (US); Eugene Henry Rascle, Jr., St. Helena Island, SC (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 20 days.

(21) Appl. No.: 15/055,271

(22) Filed: Feb. 26, 2016

(65) Prior Publication Data

US 2017/0249810 A1 Aug. 31, 2017

(51) Int. Cl.

*H04B 3/36* (2006.01)
*G08B 6/00* (2006.01)
*A41D 1/00* (2018.01)

(52) U.S. Cl.

CPC ............... *G08B 6/00* (2013.01); *A41D 1/002* (2013.01)

(58) Field of Classification Search

CPC combination set(s) only.
See application file for complete search history.

(56) References Cited

U.S. PATENT DOCUMENTS 8,082,762 B2 12/2011 Burr
8,421,607 B2 4/2013 Mahoney
9,008,859 B2 4/2015 Herzog et al.
9,140,554 B2 9/2015 Jerauld
9,290,125 B2 * 3/2016 Nagata .................. B60Q 9/008
9,327,703 B2 * 5/2016 Hill ......................... G06F 3/016
2007/0129884 A1 * 6/2007 Yamada ............ G01C 21/3652 701/425
2009/0262967 A1 10/2009 Bryan (Continued)

FOREIGN PATENT DOCUMENTS

DE 102005031000 A1 4/2007

OTHER PUBLICATIONS

Springwise; Jacket uses vibrations to guide wearers around Paris; Nov. 19, 2014; 6 pgs; http://www.springwise.com/jacket-vibrations-guide-wearers-paris/ [downloaded from internet].

*Primary Examiner* — Travis Hunnings
(74) *Attorney, Agent, or Firm* — Garlick & Markison; Bruce E. Stuckman

(57) ABSTRACT

Aspects of the subject disclosure may include, for example, a garment that includes a receiver, configured to receive at least one coded command from a notification generator, and at least one haptic feedback generator that delivers haptic feedback to a user while wearing the garment during a transit, corresponding to the at least one coded command, where the notification generator is configured to determine a notification to be sent to the user in response to at least one event of interest determined by an input analyzer, and to generate the at least one coded command that indicates the notification, and where the input analyzer is configured to analyze input data corresponding to the transit of the user of the garment to identify the at least one event of interest, occurring during the transit of the user. Other embodiments are disclosed.

20 Claims, 11 Drawing Sheets

(56) References Cited

U.S. PATENT DOCUMENTS

| | | | | |
|---|---|---|---|---|
| 2014/0111340 | A1* | 4/2014 | Zohar | G08B 21/06 340/575 |
| 2014/0184384 | A1 | 7/2014 | Zhu et al. | |
| 2014/0340207 | A1* | 11/2014 | Priest | G08B 6/00 340/407.1 |
| 2015/0145665 | A1* | 5/2015 | Hill | G06F 3/016 340/440 |
| 2015/0170493 | A1 | 6/2015 | Beggs et al. | |
| 2015/0175172 | A1* | 6/2015 | Truong | B60W 50/10 701/36 |
| 2015/0186092 | A1 | 7/2015 | Francis et al. | |
| 2016/0207454 | A1* | 7/2016 | Cuddihy | G08B 6/00 |

* cited by examiner

100

200

700

800

NOTIFICATION SYSTEM WITH HAPTIC FEEDBACK GARMENT AND METHODS FOR USE THEREWITH

FIELD OF THE DISCLOSURE

The subject disclosure relates to communication systems, haptic feedback, and garments.

BRIEF DESCRIPTION OF THE DRAWINGS

Reference will now be made to the accompanying drawings, which are not necessarily drawn to scale, and wherein.

DETAILED DESCRIPTION

Figure 1:
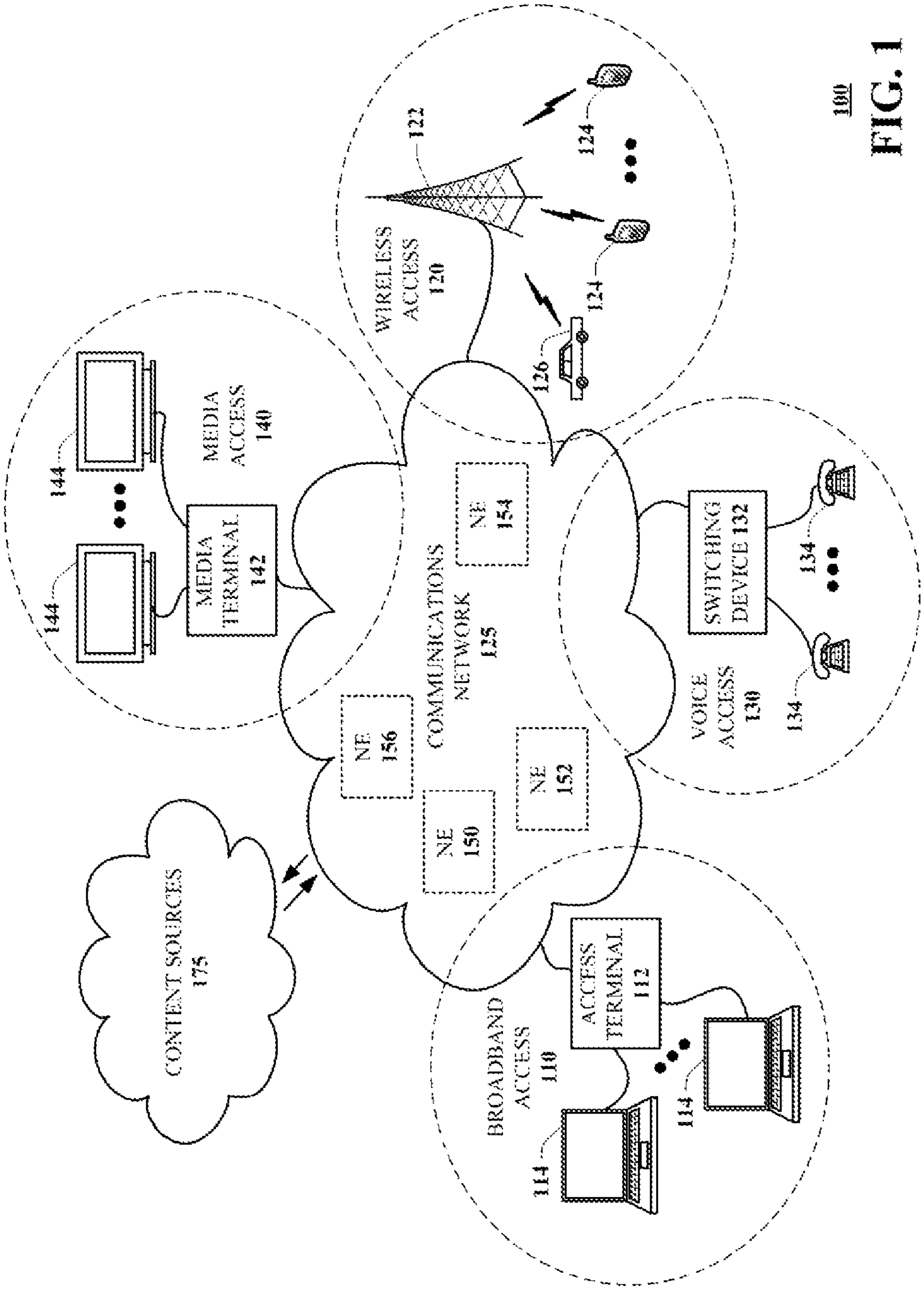
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In accordance with one or more embodiments, a garment includes a receiver, configured to receive at least one coded command from a notification generator, and at least one haptic feedback generator that delivers haptic feedback to a user while wearing the garment during a transit, the haptic feedback corresponding to the at least one coded command, where the notification generator is configured to determine a notification to be sent to the user in response to at least one event of interest determined by an input analyzer, and to generate the at least one coded command that indicates the notification, and where the input analyzer is configured to analyze input data corresponding to the transit of the user of the garment to identify the at least one event of interest, occurring during the transit of the user.

In accordance with one or more embodiments, a method includes receiving at least one coded command, wherein the at least one coded command indicates a notification, generated in response to an event of interest, identified based on input data corresponding to a transit of a user, and delivering haptic feedback to the user via a garment, wearable by the user during the transit, where the haptic feedback corresponds to the at least one coded command.

In accordance with one or more embodiments, an article of manufacture includes a tangible storage medium that stores operational instructions, that when executed by a processor, causes the processor to receive at least one coded command, wherein the at least one coded command indicates a notification, generated in response to an event of interest, identified based on input data corresponding to a transit of a user, and deliver haptic feedback to the user via a garment, wearable by the user during the transit, where the haptic feedback corresponds to the at least one coded command.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
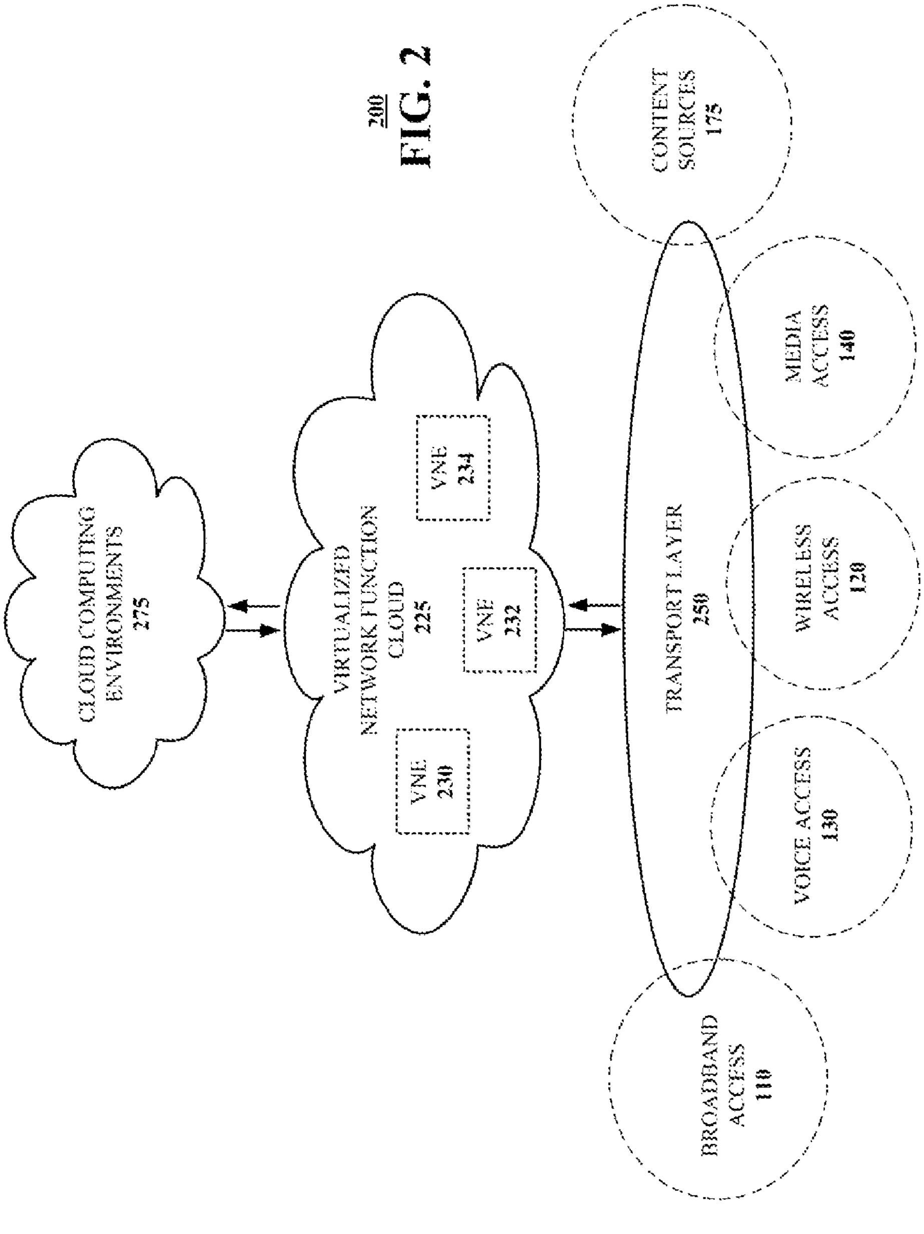
FIG. 2 is a block diagram illustrating an example, non-limiting embodiment of a virtualized communication network in accordance with various aspects described herein.

Referring now to FIG. 2, a block diagram 200 illustrating an example, non-limiting embodiment of a virtualized communication network in accordance with various aspects described herein, is shown. In particular a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 via APIs or other interfaces to allow the virtual network elements 230, 232, 234, etc. to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc. to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
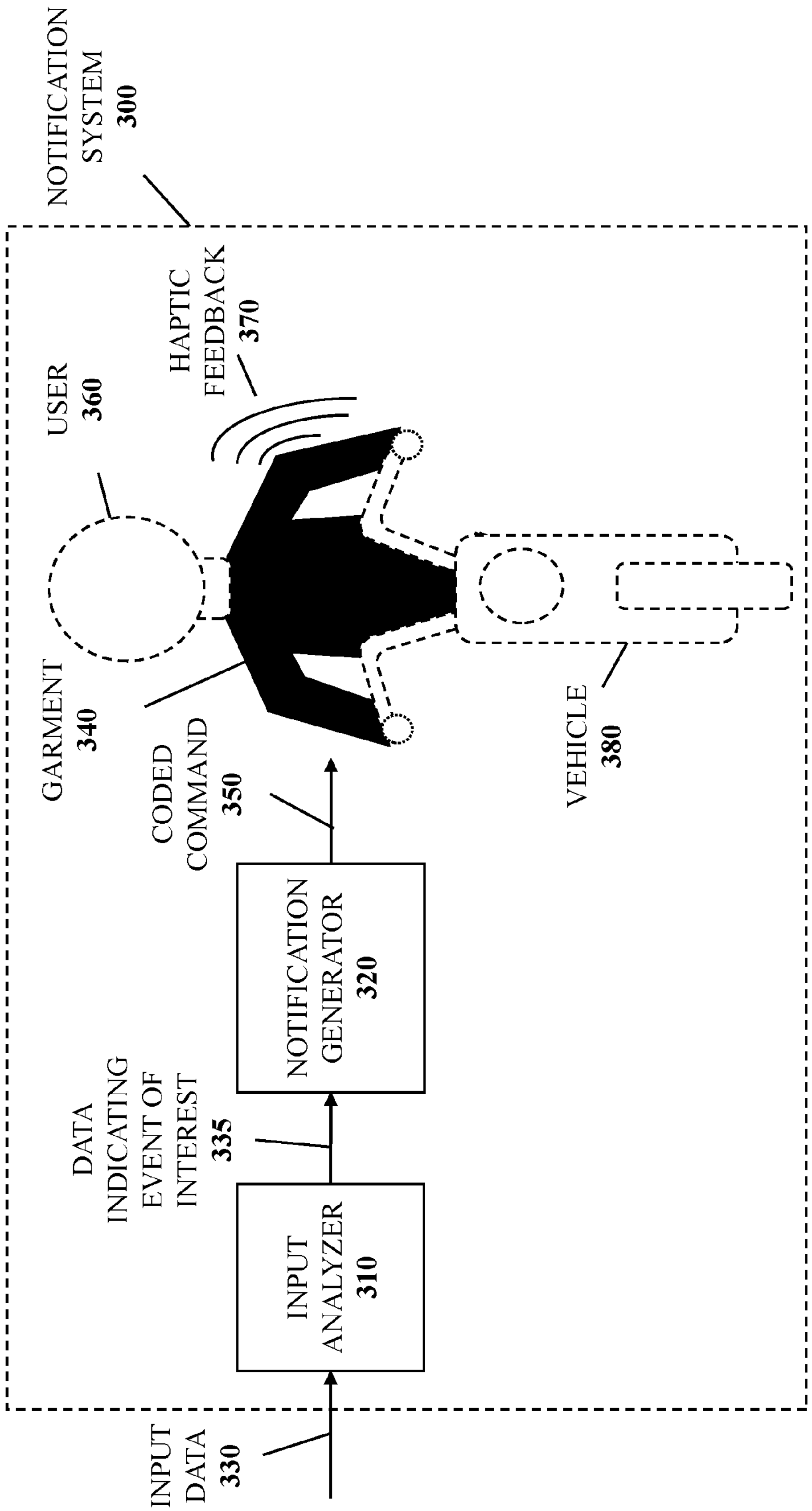
FIG. 3 is a block diagram illustrating an example, non-limiting embodiment of a notification system in accordance with various aspects described herein.

Turning now to FIG. 3, an example, non-limiting embodiment of notification system 300 is shown. The notification system 300 includes an input analyzer 310, notification generator 320 and a garment 340. The input analyzer 310 is configured to analyze input data 330 corresponding to the transit of a user 360 of the notification system 300 to identify at least one event of interest 335 and to generate data that indicates the event of interest 335. A notification generator 320, is configured to determine a notification to be sent to the user 360 in response to the data indicating the at least one event of interest 335. The notification generator 320 generates at least one coded command 350 that indicates the notification. The garment 340 is wearable by the user 360 while in transit. The garment 340 is configured to receive the at least one coded command 350 from the notification generator 320. The garment 340 generates haptic feedback 370 to the user 360 while in transit that corresponds to the at least one coded command 350.

In various embodiments, the nature of the transit, or the vehicle 380 that is being operated by the user while in transit, is such that the use of a display device by the user is infeasible or unsafe. For example, it may unsafe to view or interact with a display device while using the chosen mode of transit, a display device cannot be held while performing the chosen mode of transit because both hands are already in use, and/or the vehicle 380 does not have feasible means of mounting a display device. For example, the use of a display device by the driver of a motorcycle is unsafe and infeasible, as there is little space to install a display screen on a motorcycle, viewing a small display screen is distracting and dangerous on a motorcycle, and a driver's motion of looking down to view a display screen can have a deleterious effect on the stability of the motorcycle. Furthermore, audio notifications via an audio device such as speakers or earbuds may be dangerous or infeasible as they can be illegal in some modes of transit, distracting in a dangerous way, or ineffective in some modes of transit due to the loud nature of the mode of transit. For example, earbuds are often illegal for motorcycle drivers, and audio instructions may not be heard by a motorcycle driver in many driving environments. Notification system 300 is a safe and convenient alternative to a display device and/or an audio device. The user 360 can safely receive information about navigation, road or traffic hazards, or other information pertinent to the transit while wearing a garment 340 via haptic feedback 370.

In other various embodiments, the haptic feedback 370 provided to user 360 during transit via notification system 300 can be used to augment notifications that are provided via a display device and/or an audio device. For example, in cases where a display device can be hard to see or audio instructions can be hard to hear, clarity of notifications can be enhanced by the haptic feedback 370 that a user receives while wearing garment 340. In many modes of transit, a user is more likely to register and comprehend a notification if the notification is received through, for example, both visual and haptic feedback, or through both audio and haptic feedback. Notification system 300 can be used to enhance existing display or audio notification systems.

In various embodiments, the user 360 is in transit, and can be traveling in a vehicle, running, walking, swimming, operating a vehicle 380 or traveling by any other means. Vehicle 380 can be a motorcycle, a bicycle, a tricycle, an all-terrain vehicle, a moped, a scooter, an electric bicycle, a skateboard, a long board, a racing vehicle, a self-balancing scooter, a go-kart, a horse or other animal, a car, a truck, a recreational vehicle, a military vehicle, a plane, a train, a boat, a jet ski, a snowmobile, a hover board, a pair of skis, a snowboard, a surfboard, a kneeboard, a parachute, a fly glider, a hang glider, a wheelchair, a pair of roller skates or roller blades, an amusement park ride, or any other transportation system that operates under the control of a user. In various embodiments, vehicle 380 corresponds to and offers similar functionality as vehicle 126 presented in FIG. 1.

The input data 330 corresponding to the transit of the user 360 can include location data, navigation data, and/or other data indicating the current location of the user 360, the destination of the user 360, or directions to navigate the user 360. In various embodiments, where the user is operating a vehicle, the input data 330 corresponds to the operation of the vehicle, the location of the vehicle, and/or the navigation of the vehicle.

In various embodiments, the input data 330 can include data received during the transit, indicating factors such as speed, acceleration, temperature, cardinal direction, road conditions, or other information about the current conditions corresponding to the transit of the user. The input data 330 can include signals such as Radio Detection and Ranging (RADAR) signals, Light Detection and Ranging (LIDAR) signals, input from an ultrasonic detection system, video input from a camera or other imaging system, or other input that can be used to detect objects in the vicinity of the user. The input data 330 can also include data received from the Internet that indicates establishments nearby or on a planned navigation route, traffic conditions nearby or on a planned navigation route, accidents, hazards, or detours nearby or on a planned route, or other information about things that the user 360 may encounter in transit. The input data 330 can also include biometric data corresponding to the user, such as heart rate, perspiration levels, blood pressure, or body temperature. The input data 330 can be raw data or can be encoded and/or pre-processed before being received and analyzed by the input analyzer 310. In various embodiments, the input analyzer 310 is connected to a wireless network, and a subset of the input data 330 is received from the wireless network.

In various embodiments, the input data 330 can be collected by one or more sensors. These sensors can be coupled to the input analyzer 310 itself, coupled to the vehicle 380, coupled to the garment 340, coupled to a different garment or wearable device worn by the user 360, coupled to a mobile device operated by the user 360, coupled to one or more other mobile devices, coupled to a fixed location corresponding to the transit route of the user 360, and/or coupled to another person or vehicle. The sensors can be equipped with transceivers and can transmit raw or pre-processed sensor data to the input analyzer.

In various embodiments, the input data 330 can also include data collected through a second notification system 300 corresponding to a second user 360. The input data collected and associated with the second user may be relevant to the first user 360 because the second user is in, or was recently in, the vicinity of the first user, and/or the second user is on, or was recently on, the same route as the first user. This input data 330 corresponding to the second user can be received over a wireless network of notification systems 300, or another type of network, such as the communications network 125 presented in FIG. 1.

The input analyzer 310 is configured to analyze input data 330 to identify at least one event of interest 335. In various embodiments, this event of interest 335 can be a hazard such as the abrupt deceleration of a vehicle in front of the user 360, an abrupt swerving of a vehicle to the right or left of the user 360, slippery road conditions, the deployment of anti-lock brakes or electronic stability control by a vehicle being operated by the user 360, an object or person directly in front of the user, a gas tank that is almost empty, operating at an unsafe speed for the current location, a person, object, or vehicle in the blind spot of the user 360, or any other imminent road or traffic hazard that the user 360 of the notification system 300 should be made aware of. The event of interest 335 can also indicate a navigational event, such as the time to make a turn in a planned route of transit, a time to change lanes in a planned route of transit, a point in transit when an establishment of interest is nearby, a change in the planned route due to an accident on the route or a change in traffic conditions, or any other navigational event that the user 360 of the notification system 300 should be made aware of.

The notification generator 320 is configured to determine a notification to be sent to the user 360 in response to the at least one event of interest 335, and generates a coded command 350 that corresponds to this notification. In various embodiments, such notifications can include information pertinent to the transit, such as "There is an object blocking the middle of the road," "There is a vehicle rapidly approaching from the left," or "This is an unsafe speed for transit in this area," or any other notification that may require the user to take action. In various embodiments, the notification can include a specific instruction to the user in response to the event of interest such as "Turn left" or "Brake now". The notification can also indicate other information of interest, such as "There is a coffee shop ahead, on the left."

In various embodiments, the input data 330 includes navigational data, and the at least one coded command 350 includes at least one navigational instruction. For example, in response to navigational input data indicating an event of interest corresponding to a left turn in 300 feet, the notification can include "Turn left in 300 feet."

In various embodiments, the input data 330 indicates unsafe situation, and the at least one coded command 350 notifies the user of the unsafe situation. For example, in response to input data indicating an event of interest corresponding to an object in the path directly in front of the user, the notification can include "There is an object obstructing the path ahead."

In various embodiments where the input data 330 indicates an unsafe situation, the at least one coded command 350 also provides instructions to the user to avoid the unsafe situation. In the previous example, the notification can also include the instruction "Veer left to avoid the object."

The notification generator 320 generates a coded command 350 that corresponds to this notification. This coded command 350 corresponds to the haptic feedback that will be generated by the garment 340 to notify the user 360 of the notification. In various embodiments, the coded command 350 can contain information pertaining to the type of haptic feedback 370 to be received by the user 360, the length of time a user 360 will receive the haptic feedback 370, the location on the body that the user 360 will receive the haptic feedback 370, or other information concerning the delivery of the haptic feedback 370 to the user 360, based on the notification determined by the notification generator 320.

In various embodiments, the at least one coded command 350 indicates a haptic feedback pattern, designating a series of time intervals where haptic feedback is generated in at least one location on the garment. The haptic feedback pattern can indicate the use of one or more haptic feedback generators in specific locations of the garment 340 at specific times in the pattern. For example, the notification generator may wish to send the notification "Turn left" to the user 360, and send a coded command 350 that indicates that the garment 340 will first deliver strong haptic feedback on the left shoulder of the user 360, followed by a long, repeated haptic feedback on the left wrist of the user 360.

As previously discussed, the garment 340 is wearable by the user 360. The garment 340 may include a jacket, a shirt, pants, shorts, full or partial body padded armor, a helmet, at least one glove, at least one band, brace, or pad that can be worn around the wrist, waist, leg, arm, neck, shoulder or ankle, a smart watch, a scarf, a hat, a necklace, a bracelet, a headband, a vest, an adhesive patch, footwear, at least one undergarment, a face mask, at least one sock, or any other garment that can be worn. The garment 340 generates haptic feedback 370 to the user 360. This haptic feedback can include vibrations, pressure, squeezing, temperature changes, rotational or frictional skin stretch, electrotactile stimulation, or other haptic sensations that the garment can provide the user to convey information. This haptic feedback can be induced by one or more haptic feedback devices, including vibration motors, linear resonant actuators, shape memory alloys, thermal actuators, or other devices that induce a haptic sensation. In various embodiments, one or more haptic feedback devices can be permanently integrated in the garment, or can temporarily be attached on or under an existing garment. In various embodiments, the one or more haptic feedback devices can each have transceivers to receive coded commands from the notification generator, or can each have a wired connection to the notification generator, and the notification generator can send coded commands to each haptic feedback device separately. In other embodiments, the one or more haptic feedback devices can have a wired or wireless connection to a haptic feedback controller, coupled to the garment, that receives coded commands from the notification generator, which may be processed or sent directly to one or more of the haptic feedback devices as necessary.

In various embodiments, the input analyzer 310, the notification generator 320, the garment 340, and/or the vehicle 380 can be equipped with one or more processors and/or memory devices to perform the functions described. These modules can transmit and receive the communications described via wired or wireless connections between them. In various embodiments the input analyzer 310, the notification generator 320, the garment 340, and/or the vehicle communicate via a wireless network such as a piconet, personal area network, vehicle network, local area network or other network. In various embodiments, this network can communicate with or include any portion of the communication network 125 presented in FIG. 1. In various embodiments, two or more of the input analyzer 310, the notification generator 320, the garment 340, and/or the vehicle 380 can coupled to each other, operating as shared modules and can, for example, share the same processor and/or memory.

Further examples and implementations including one or more optional functions and features are presented in conjunction with FIGS. 4-8 that follow.

Figure 4A:
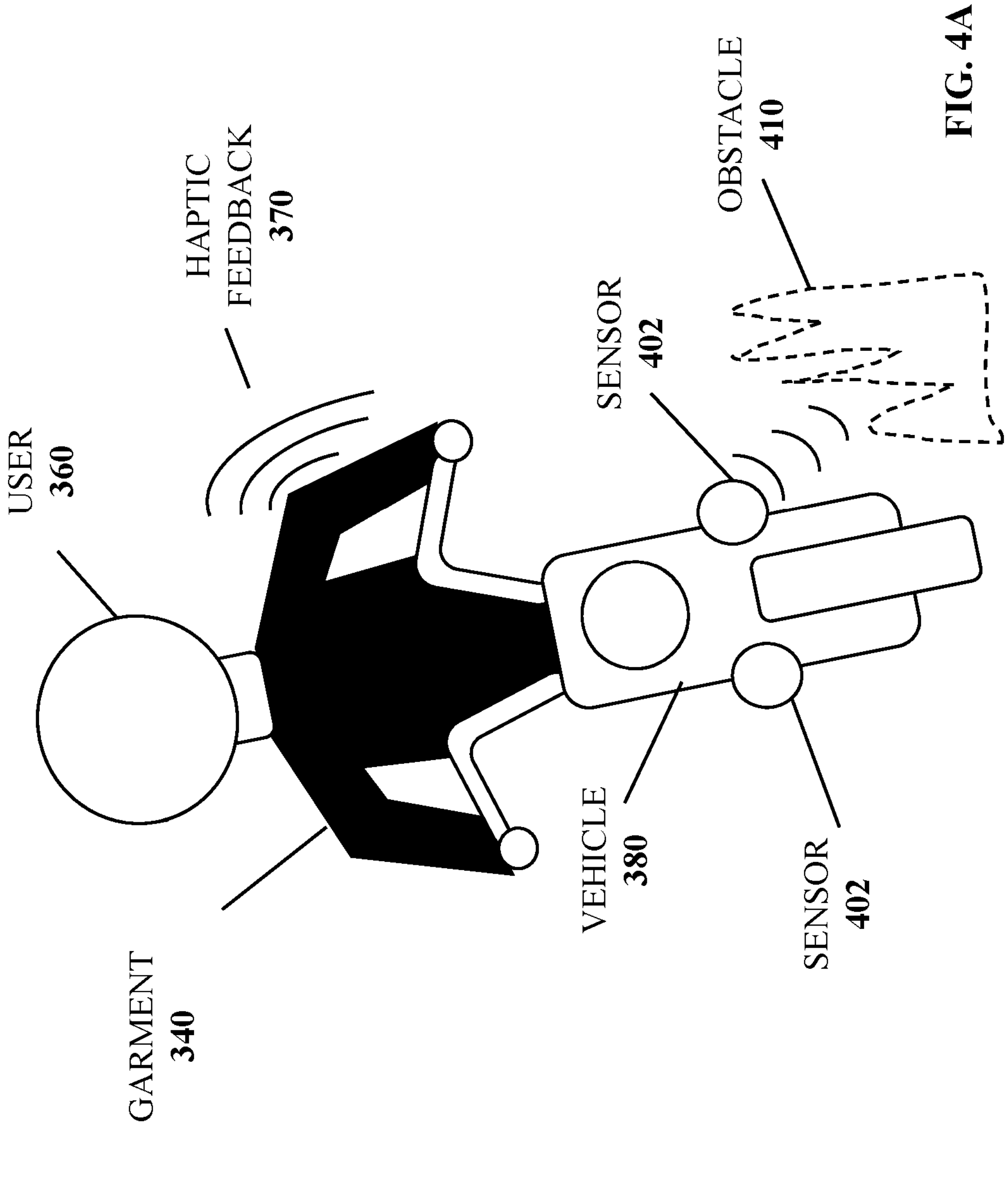
FIG. 4A is a block diagram illustrating an example, non-limiting embodiment of a notification system in accordance with various aspects described herein.

Turning now to FIG. 4A, an example, non-limiting embodiment of notification system 300 is shown. One or more sensors 402 are coupled to vehicle 380, and are used to provide at least a subset of input data 330.

In various embodiments, the vehicle 380 has one or more sensors 402, and the input data 330 includes data from these sensors. Sensors 402 may indicate factors such as speed, acceleration, road conditions, cardinal direction, gas level, engine conditions, revolutions per minute, status of electronic stability control, status of an anti-lock brake system, or other information about the current conditions of the vehicle. The sensors 402 can also indicate conditions in the surrounding environment, such as temperature, the location of objects such as obstacle 410, other vehicles, or people in the vicinity of the vehicle 380 that may be a safety hazard. Such sensors can include Radio Detection and Ranging (RADAR) sensors, Light Detection and Ranging (LIDAR) sensors, video cameras, or other sensors that can be used to detect objects in the vicinity of the user. These sensors 402 can be equipped with transceivers and can transmit raw or pre-processed sensor data to the input analyzer in accordance with a wireless communication protocol such as Bluetooth, ZigBee or other short-range communication system. In various embodiments, the vehicle 380 can be configured to collect the data from sensors 402 and transmit this sensor data in a raw or processed form to the input analyzer 310.

Figure 4B:
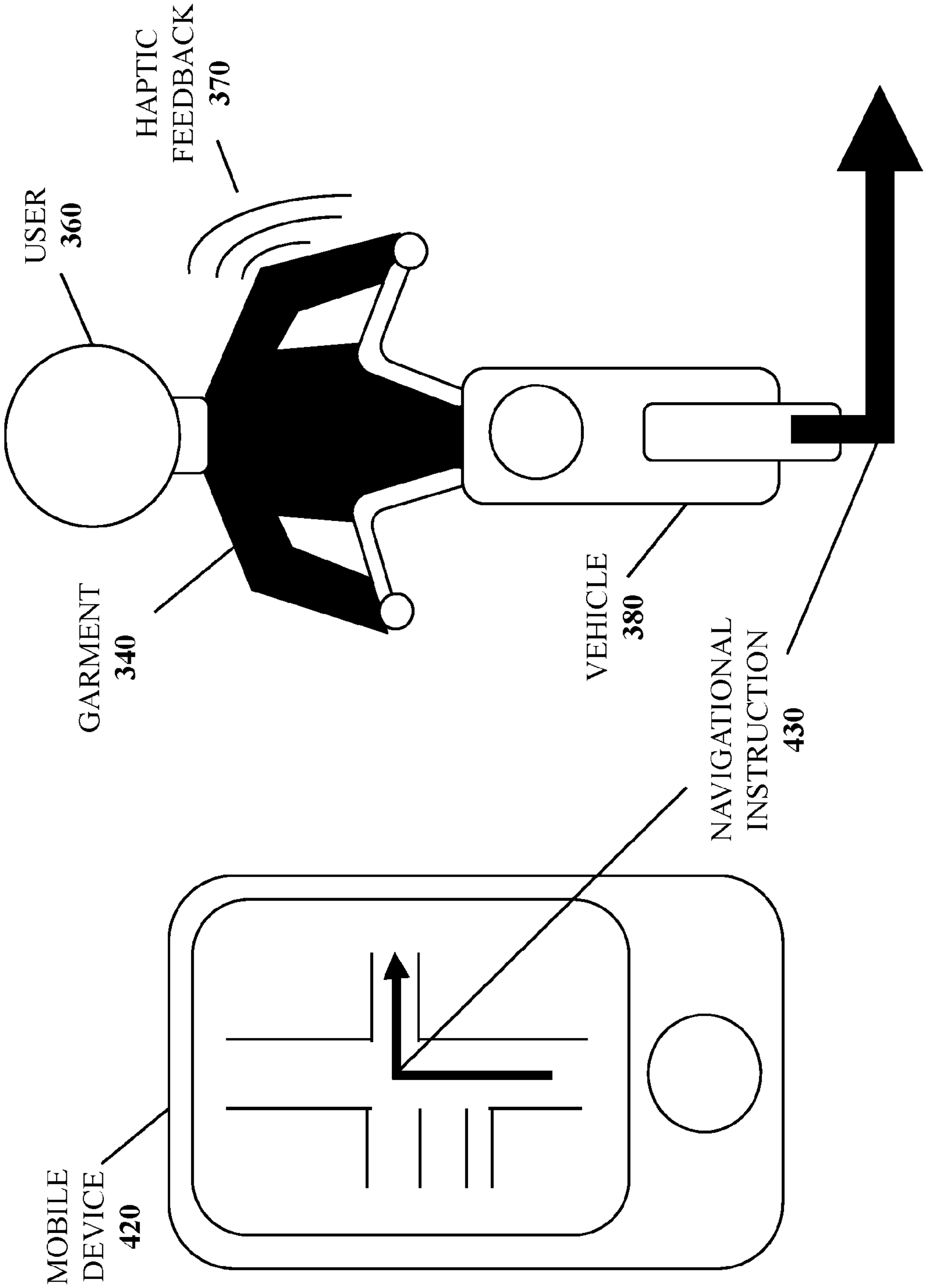
FIG. 4B is a block diagram illustrating an example, non-limiting embodiment of a notification system in accordance with various aspects described herein.

Turning now to FIG. 4B, an example, non-limiting embodiment of notification system 300 is shown. In various embodiments, a mobile device 420 associated with the user can be used to retrieve input data 330, either from sensors on the mobile phone itself, such as accelerometer data or camera data, or data collected by the mobile phone while connected to a wireless network, such as location data, navigational instructions, traffic conditions, known road hazards or detours on the route, the location of establishments of interest close to the current location or on the route, or other data relevant to the user. The mobile device 420 can also receive input data 330 transmitted by other sensors.

In various embodiments, the input data 330 can include other data related to the mobile device. This input data 330 can include texts or calls received, notifications corresponding to an application installed on the mobile device, or diagnostics of the mobile device such as power level or signal strength. Furthermore, in various embodiments, the notification generator can generate coded commands corresponding to notifications received on the mobile device, including texts or calls received, notifications corresponding to an application installed on the mobile device, or diagnostics of the mobile device such as power level or signal strength.

For example, FIG. 4B depicts that the mobile device 420 indicates a navigational instruction 430 corresponding to a right turn. This navigational instruction may be available for example, through a navigation or map application downloaded to and executed by the mobile device 420. Based on the haptic feedback 370 received via the garment 340 and transmitted to the user 360, the user knows to turn right accordingly.

In various embodiments, the input analyzer 310 and/or the notification generator 320 can be implemented by the mobile device 420 associated with the user 360. For example, the input analyzer 310 and/or the notification generator 320 can be implemented via a mobile application that is downloaded to an executed by the mobile device 420. In various embodiments, the communications to and from the input analyzer 310 and/or the notification generator 320 can be accomplished via the inherent operation of such a mobile application.

In various embodiments, mobile device 420 corresponds to and offers the same functionality as one of mobile devices 124 described in FIG. 1. While shown as a separate device such as a handheld unit, the mobile device 420 can also be implemented as part of a vehicle 126 as described in FIG. 1. In various embodiments, the mobile device 420 can be connected to the communication network 125 as described in FIG. 1.

Figure 4C:
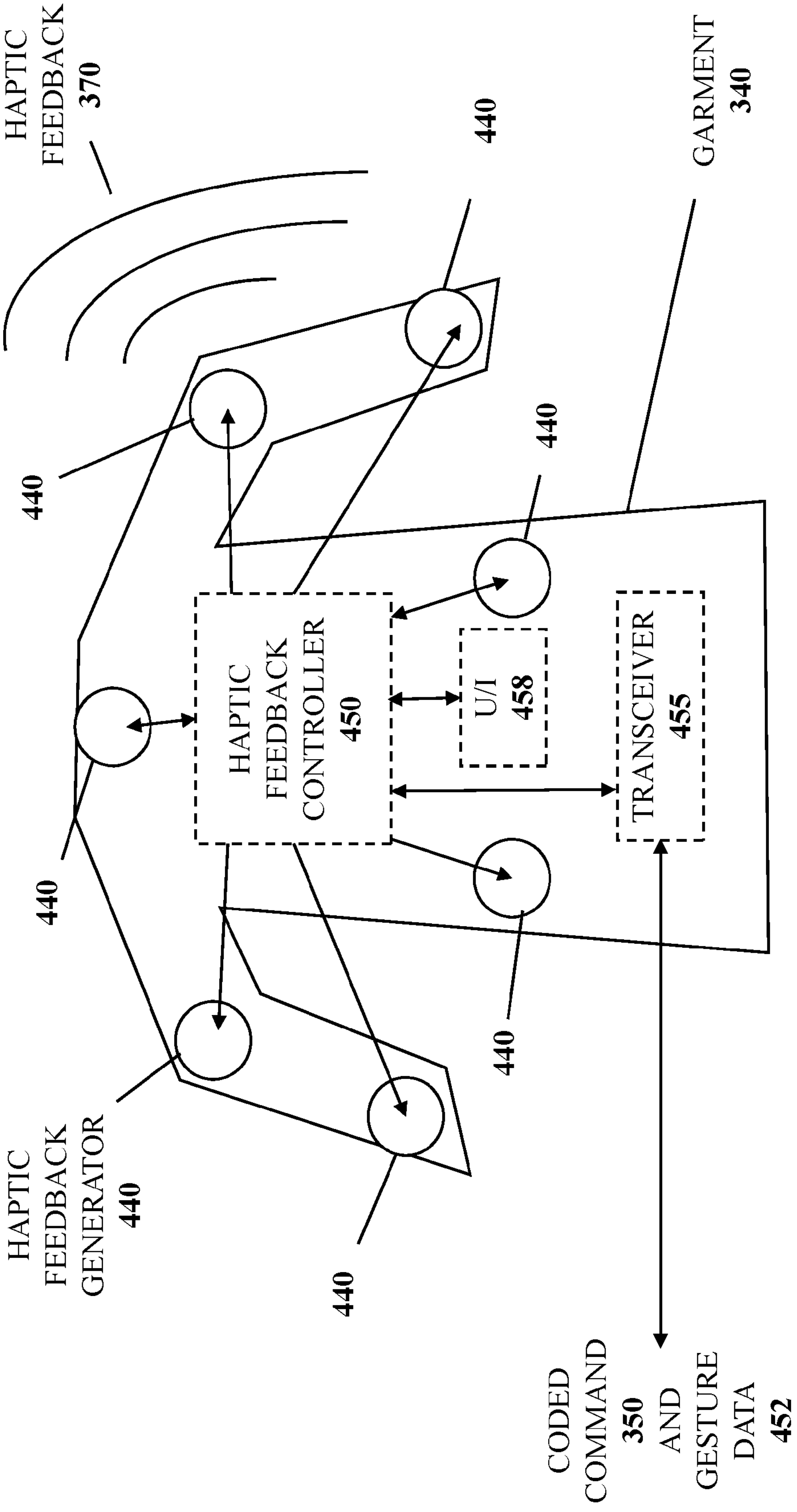
FIG. 4C is a block diagram illustrating an example, non-limiting embodiment of a garment in accordance with various aspects described herein.

Turning now to FIG. 4C, an example, non-limiting embodiment of garment 340 is shown. In various embodiments, one or more haptic feedback generators 440 are coupled to a haptic feedback controller 450 via a wired or wireless connection. A transceiver 455 that includes a receiver configured to receive coded commands 350 from the notification generator 320, which may be processed by the haptic feedback controller 450 or sent directly to one or more haptic feedback generators 440, corresponding to the haptic feedback pattern indicated in the coded command 350. In an embodiment, the one or more haptic feedback generators 440 are located in several different places on the garment, and the haptic feedback pattern corresponds to a series of time intervals where one or more of the haptic feedback generators are activated.

In various embodiments, the coded commands 350 received from the notification generator 320 can indicate the notification to be delivered to the user 360, but without indicating the haptic feedback pattern. The haptic feedback controller 450 can include a look-up table, one or more devices drivers and/or other processing circuitry to translate the coded commands 350 into signals that drive the haptic feedback generators 440. For example, the haptic feedback controller 450 can determine the necessary haptic feedback pattern based upon the coded commands 350, the indicated notification and, for example, fixed or pre-programmed user settings that indicate the particular haptic feedback pattern to be generated for the particular notification indicated by the coded commands 350.

In various embodiments, the haptic feedback generators 440 generate a vibration to the user, and the haptic feedback pattern indicates a series of time intervals where one or more vibrations are emitted in one or more locations on the garment.

The haptic feedback controller 450 can be implemented via a processing device. Such a processing device can include one or more microprocessors, micro-controllers, digital signal processors, microcomputers, central processing unit, field programmable gate arrays, programmable logic device, state machines, logic circuits, analog circuits, digital circuits, and/or any device that manipulates signals (analog and/or digital) based on hard coding of the circuitry and/or operational instructions. The processing device may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing device includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing device implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing device executes, hard coded and/or operational instructions corresponding to at least some of the steps and/or functions described herein. Such a memory device or memory element can be included in an article of manufacture.

In various embodiments, the garment 340 further includes a user interface (U/I) 458 that includes, for example, at least one sensor that registers motions made by the user 360, allowing the user to communicate with the notification generator 320 via U/I data 452 that indicates at least one gesture or other user interaction while wearing the garment 340. The sensors included on garment 340 can include accelerometers, gyroscopes, pressure sensors, or other sensors that detect responses such as motions or pressure generated by gestures or other interactions performed by the user. These sensors can also include buttons, knobs, sliders, switches, or other devices located on the garment that a user can activate to generate other forms of U/I data 452. Motions made by the user can include actions such as squeezing fingers, lifting a limb, wiggling one or more fingers, shaking the head, or other actions that can be registered by sensors in the garment 340. In various embodiments, these sensors can be coupled to one or more haptic feedback generators on different locations of the garment. The transceiver 455 includes a transmitter that enables U/I data that indicates requests and/or responses indicated by these gestures or other interactions to be sent back to the notification generator 320. In some embodiments, where a vehicle 380 is mobile device 420 is included in the notification system, garment 340 can send requests and/or responses to the vehicle or mobile device directly, or send requests and/or responses to the vehicle or mobile device via the notification system 320.

In various embodiments, the garment 340 can detect gestures by the user 360 and generate U/I data 452 that indicate acknowledgement responses to notifications received by the notification generator 320. For example, a gesture by the user 360 can indicate a response of "yes" or "no" to the notification generator 320. For example, if the notification generator notifies the user that a coffee shop is five minutes away, the user can indicate "yes" through one of these actions to begin navigation to the coffee shop, and can indicate "no" through a different action to indicate they would like to skip the coffee and remain on the current route.

In various embodiments, the garment 340 can detect gestures by the user 360 that indicate requests to the notification generator 320, the vehicle 380, and/or the mobile device 420. For example, a gesture by the user can indicate to the notification generator 320 that they would like to begin navigation home, cancel the current navigation, or repeat the previous navigational instruction. Other gestures made by the user can indicate requests to the vehicle 380 that include, for example, a change in radio station, a change in the air conditioning settings, or a change in the seat position. Other hands-free gestures made by the user can indicate requests to the mobile device 420 that include, for example, powering down to conserve battery, calling 911, responding to a text message, interacting with an application installed on the mobile device, or calling someone in the user's contact list.

In various embodiments, the requests to the notification system, vehicle, and/or mobile device may indicate a request for information to be delivered via haptic feedback generated by the garment. Such information can include, for example, distance traveled, gas level, or number of text messages received since the start of the trip, that require coded commands for further haptic feedback patterns to be sent in response by the notification generator 320. This information can correspond to any of the input data 330 associated with the notification system 300, or to other data corresponding to the vehicle or the mobile device 420 associated with the user. In various embodiments, the request for information can trigger an event of interest 335 by the input analyzer 310. For example, the notification generator may respond to such a request with a haptic feedback pattern such as five vibrations to the back of the neck to indicate that the user has traveled five miles since the last stop, with a haptic feedback pattern such as three squeezes of the waist to indicate that the gas level is three-fourths full, or a haptic feedback pattern of two vibrations of the fingertips to indicate that the user has two new text messages on their mobile device. The various meanings and requests corresponding to different user response actions, as well as the haptic feedback patterns made in response to the user response actions, can also be customized by the user based on the user's preferences and needs as discussed in previous embodiments.

In various embodiments, the requests and/or responses can be instead detected by sensors on the vehicle 380 itself. The vehicle 380 can include sensors such as buttons, knobs, switches, sliders, an interactive display, motion capture devices, audio capture devices, or other devices that can detect gestures, tactile commands, or audio commands made by the user. Similar to embodiments where the garment is equipped with sensors to capture requests and/or responses, the vehicle 380 can communicate the requests/responses it detects to appropriate elements of the notification system 300 such as the notification generator 320.

Figure 4D:
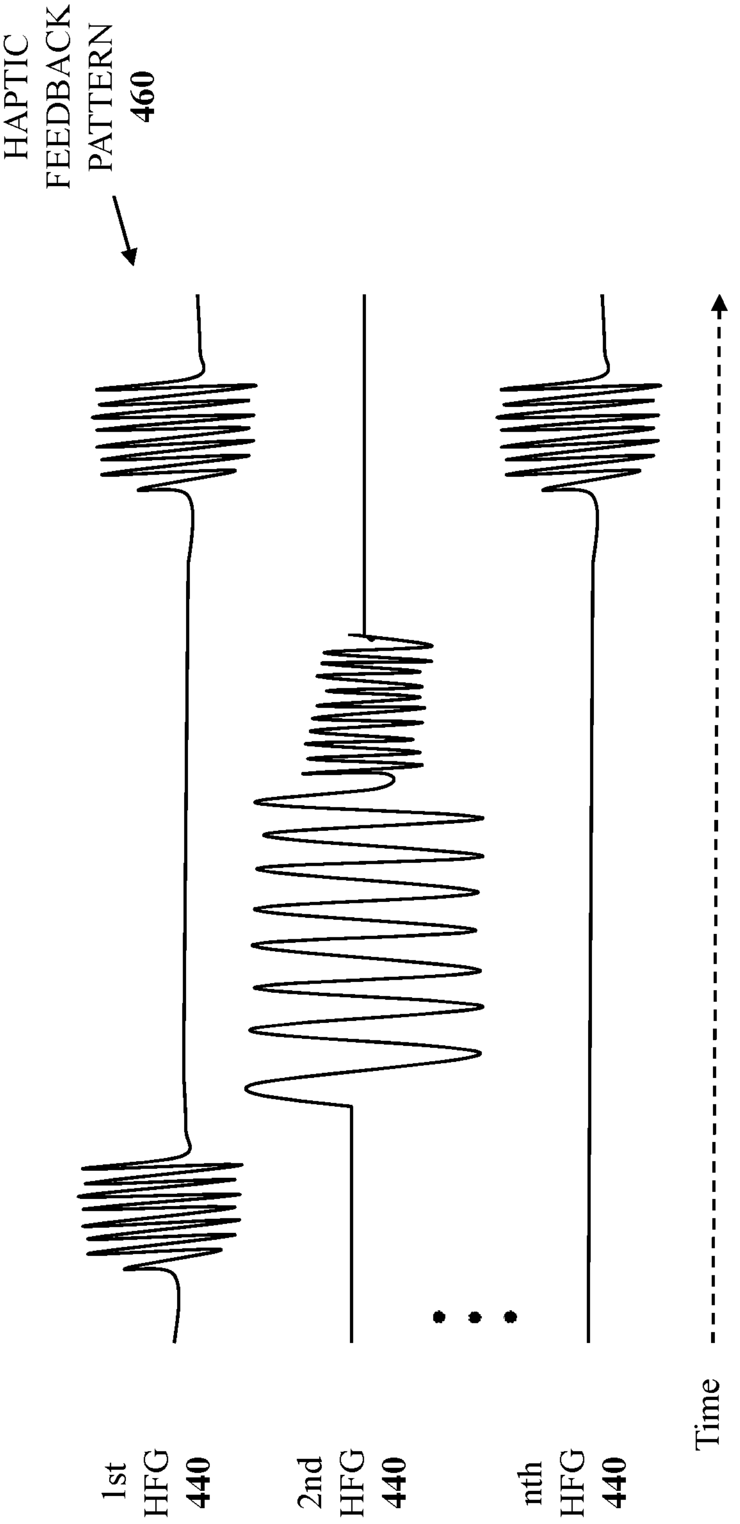
FIG. 4D is a temporal diagram illustrating an example, non-limiting embodiment of a haptic feedback pattern in accordance with various aspects described herein.

Turning now to FIG. 4D, an example, non-limiting embodiment of a haptic feedback pattern 460 is shown. In various embodiments, the haptic feedback pattern 460 indicates a series of time intervals where one or more haptic feedback generators (HFG) 440 are activated in one or more locations on the garment.

In various embodiments, the set of notifications and the corresponding haptic feedback patterns indicated by the coded commands 350 may be fixed or programmable by the user 360, for example, as to the order or sequence that one or more haptic feedback generators 440 are activated, the duration of time each haptic feedback generator is activated in each time interval in the sequence and/or the frequency of vibration. This enables the user 360 to determine notifications are important to them, and user 360 may choose to enable several notifications or few notifications. Furthermore, the user 360 can customize their experience by, for example determining custom events of interest that they wish to trigger a notification. For example, the user may choose particular types of locations that warrant notifications in certain conditions. For example, a user 360 may wish to be notified when they pass a gas station if the gas tank of vehicle 380 is less than 20% full. The user 360 can enable this notification, and set the corresponding haptic feedback pattern to deliver three vibrations to the neck, followed by a vibration on the left or right shoulder to indicate on which side of the road the gas station is located. Another user 360 may wish to be notified when there is a beach or pool on their current route if the outside temperature is at least seventy degrees Fahrenheit, and then set the corresponding haptic feedback pattern to deliver two squeezes of the waist to indicate there is a beach on the route and the temperature is at least seventy degrees, and then later, a long squeeze of the left or right wrist once it is time for the user to turn left or right to arrive at the beach. In various embodiments, the user 360 can also determine haptic feedback types and body locations that are most effective for them, and can customize the haptic feedback patterns accordingly. In other various embodiments, notification system 300 can have a fixed set of notifications and/or a fixed set of haptic feedback patterns, and may offer little or no customization options.

In various embodiments, where the notification system 300 includes a mobile device 420, the user can enable notifications corresponding to mobile device data. For example, the user can enable notifications when texts or calls are received, notifications corresponding to an application installed on the mobile device, or diagnostics of the mobile device such as power level or signal strength. In various embodiments, the user can configure the subset of such notifications that they wish to receive, and configure their corresponding haptic feedback patterns. For example, the user can choose to receive haptic feedback to notify them only of incoming calls from Mom, or to notify them only when a sports application indicates that a Georgia Tech football game has kicked off. These settings can be configured on the mobile device directly, or on another interface associated with the notification system 300.

In various embodiments, such customization of events of interest, notifications, haptic feedback patterns, and/or user response actions is possible through a user interface on the input analyzer 310, the notification generator 320, and/or the user interface 458 of the garment 340 which may include a display, a touchscreen, knobs, switches, sliders, and/or buttons, or another type of user interface. In various embodiments, a user can customize their preferences through a user account on a server, which may be accessed through a mobile device application and/or a web application via a tablet or personal computer. The preferences can be stored on either the notification generator 320 or the garment 340. In various embodiments, a user can customize preference directly through interaction with the vehicle 380 or the mobile device 420.

Figure 5:
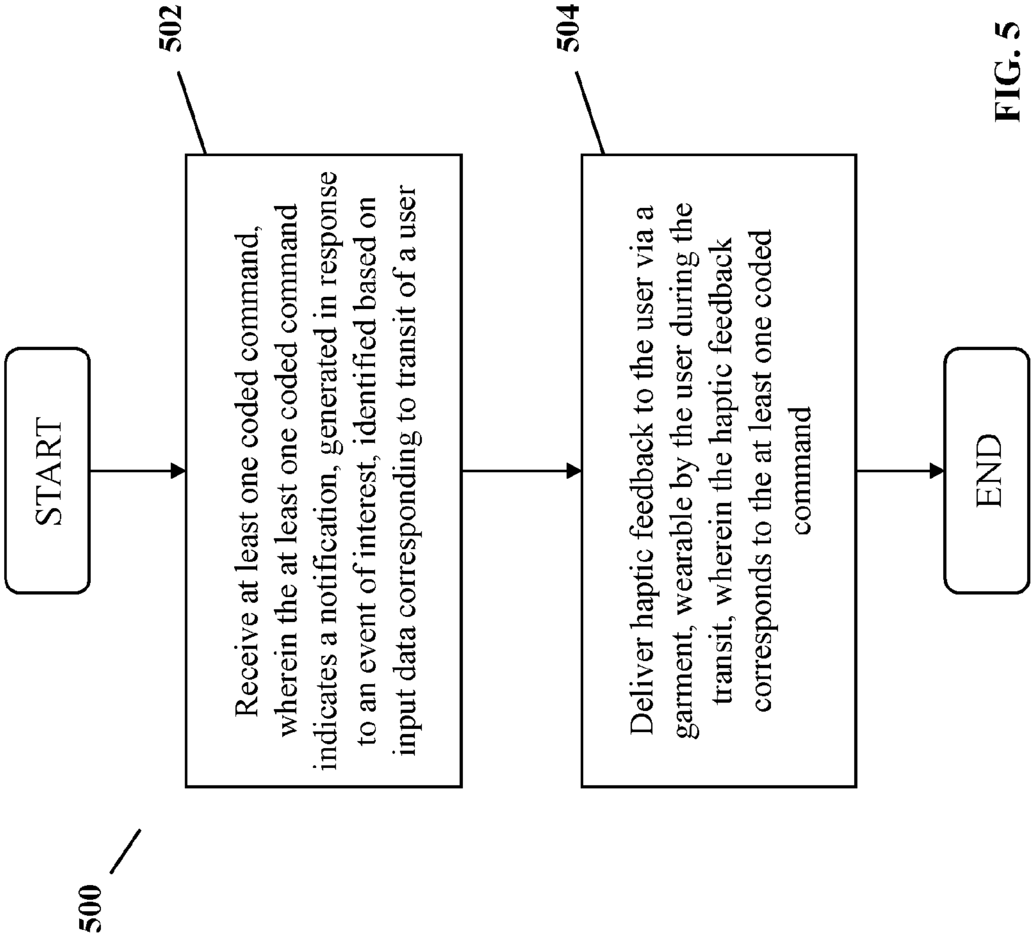
FIG. 5 illustrates a flow diagram of an example, non-limiting embodiment of a method in accordance with various aspects described herein.

Turning now to FIG. 5, a flow diagram 500 of an example, non-limiting embodiment of a method, is shown. In particular, a method is presented for use with one or more functions and features presented in conjunction with FIGS. 1-4. Step 502 includes receiving at least one coded command, wherein the at least one coded command indicates a notification, generated in response to an event of interest, identified based on input data corresponding to transit of a user. Step 504 includes delivering haptic feedback to the user via a garment, wearable by the user during the transit, wherein the haptic feedback corresponds to the at least one coded command.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments of the method, the user is operating a vehicle, and the input data corresponds to at least one of: the operation of the vehicle, the location of the vehicle, or the navigation of the vehicle.

In various embodiments of the method, the vehicle has one or more sensors, and wherein the input data includes data from the one or more sensors.

In various embodiments of the method, the input data includes navigational data, and the at least one coded command indicates at least one navigational instruction.

In various embodiments of the method, the event of interest indicates an unsafe situation, and wherein the at least one coded command notifies the user of the unsafe situation.

In various embodiments of the method, the at least one coded command also provides instructions to the user to avoid the unsafe situation.

In various embodiments of the method, the at least one coded command indicates a haptic feedback pattern, designating a series of time intervals indicating haptic feedback to be generated in at least one location on the garment.

Figure 6:
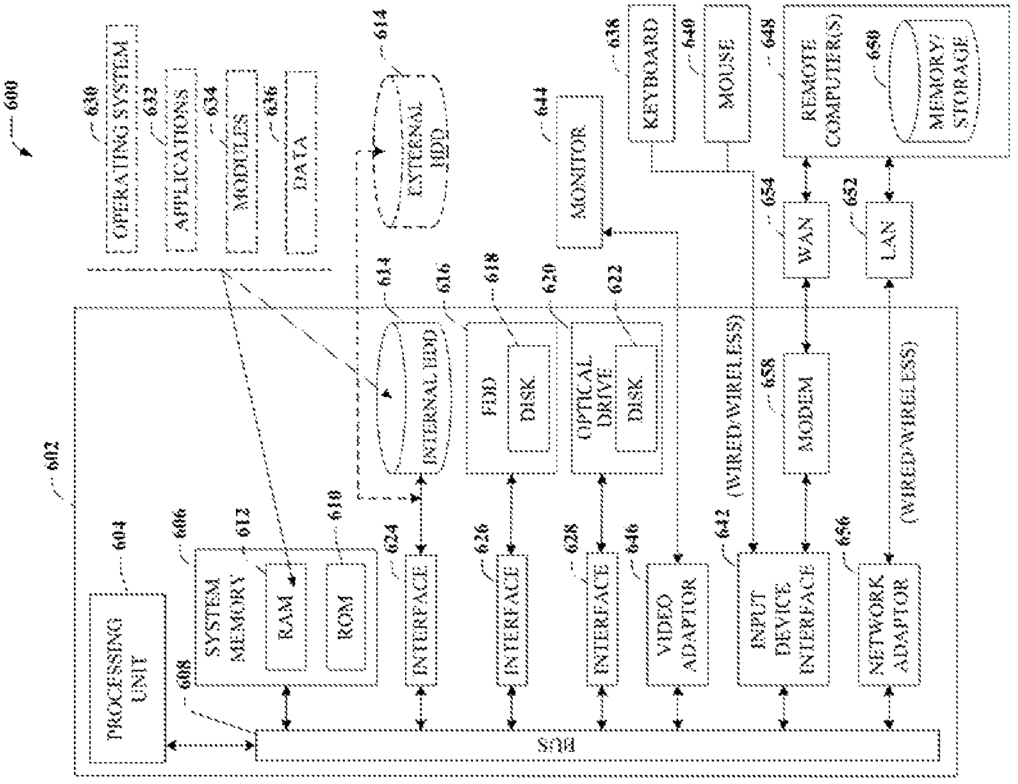
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or virtual network elements 230, 232, 234, etc. and/or be used to establish the user preferences via server or direct communication with either garment 340 or notification generator 320. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal hard disk drive 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local area network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
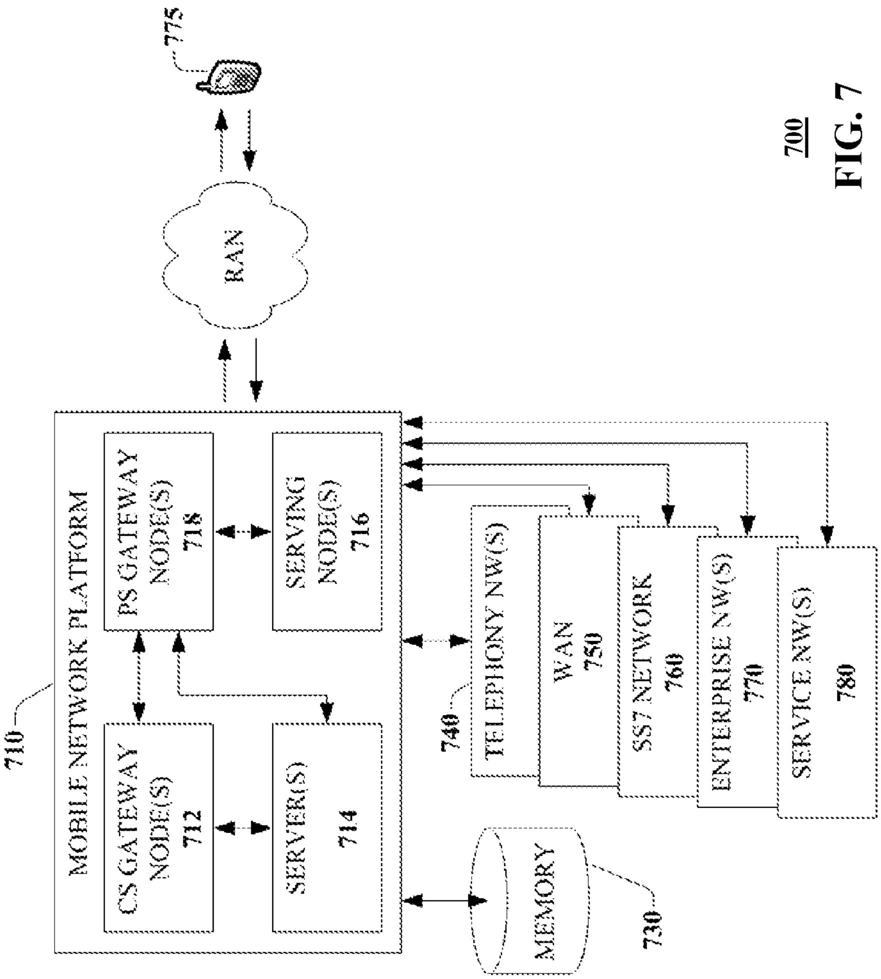
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or virtual network elements 230, 232, 234, etc. In one or more embodiments, the mobile network platform 710 can generate and receive signals transmitted and received by base stations or access points such as base station or access point 122 in conjunction with service to a mobile device 775, such as a mobile device 124, vehicle 126, data terminal 114 or other wireless device. Generally, wireless network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 770. Circuit switched gateway node(s) 712 can authorize and authenticate traffic (e.g., voice) arising from such networks. Additionally, CS gateway node(s) 712 can access mobility, or roaming, data generated through SS7 network 770; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the wireless network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 760 can embody, at least in part, a service network(s) like IP multimedia subsystem (IMS). Based on radio technology layer(s) in available technology resource(s), packet-switched gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, wireless network platform 710 also comprises serving node(s) 716 that, based upon available radio technology layer(s) within technology resource(s) 717, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in wireless network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to wireless network platform 710 (e.g., deployed and operated by the same service provider), such as the distributed antennas networks shown in FIG. 1(*s*) that enhance wireless service coverage by providing more network coverage.

It is to be noted that server(s) 714 can comprise one or more processors configured to confer at least in part the functionality of macro wireless network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of wireless network platform 710. Other operational information can comprise provisioning information of mobile devices served through wireless platform network 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, enterprise network(s) 770, or SS7 network 760. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
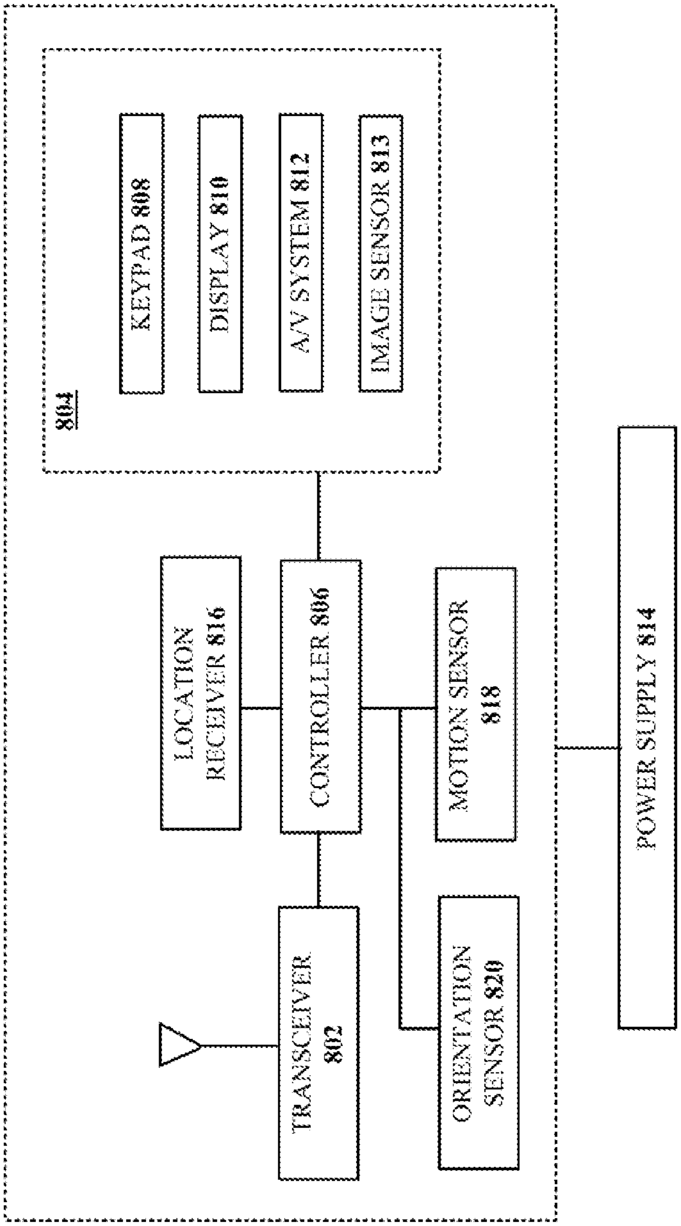
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144, mobile device 420 or other client devices for communication via either communications network 125.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize one or more computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

In various embodiments, communication device 800 can implement the input analyzer 310 and the notification generator 320, and further can communication with the garment 340 introduced in FIG. 3 via transceiver 455. Furthermore, the vehicle 380 introduced in FIG. 3 and/or the embodiment of the vehicle 380 introduced in FIG. 4A can communicate with communication device 800. Vehicle 380 can also correspond to vehicle 126.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A garment comprising:

a receiver, configured to receive a plurality of coded commands from a notification generator that is separate from the garment;

at least one haptic feedback generator that delivers a plurality of haptic feedbacks to a user while wearing the garment during a transit, wherein a first haptic feedback of the plurality of haptic feedbacks corresponds to a first coded command of the plurality of coded commands, and wherein a second haptic feedback of the plurality of haptic feedbacks corresponds to a second coded command of the plurality of coded commands; and at least one sensor that registers a motion made by the user;

wherein the notification generator is configured to determine a first notification to be sent to the user in response to at least one event of interest determined by an input analyzer, and to generate the first coded command that indicates the first notification;

wherein the input analyzer is configured to analyze input data corresponding to the transit of the user of the garment to identify the at least one event of interest, occurring during the transit of the user;

wherein the motion registered by the at least one sensor comprises at least one gesture made by the user while wearing the garment, for wireless transmission to the notification generator, wherein the motion corresponds to one of a plurality of requests; and wherein the notification generator is further configured to determine a second notification to be sent to the user in response to the one of the plurality of requests corresponding to the motion, and to generate the second coded command that indicates the second notification.

2. The garment of claim 1, wherein the user is operating a vehicle, and the input data corresponds to at least one of: operation of the vehicle, location of the vehicle, or navigation of the vehicle.

3. The garment of claim 2, wherein the vehicle has one or more sensors, and wherein the input data includes data from the one or more sensors.

4. The garment of claim 1, wherein the input data includes navigational data, and wherein the first coded command indicates at least one navigational instruction that indicates a turn direction, and wherein the first haptic feedback is delivered to the user in a location of the garment corresponding to the turn direction.

5. The garment of claim 1, wherein the at least one event of interest indicates an unsafe situation, and wherein the first coded command indicates the unsafe situation.

6. The garment of claim 5, wherein the first coded command also indicates instructions for the user to avoid the unsafe situation.

7. The garment of claim 1, wherein the notification generator is coupled to a mobile device associated with the user.

8. The garment of claim 1, wherein the input analyzer is connected to a wireless network, and a subset of the input data is received from the wireless network.

9. The garment of claim 1, wherein the at least one haptic feedback generator generates a vibration to the user.

10. The garment of claim 1, wherein the first coded command indicates a first haptic feedback pattern and the second coded command indicates a second haptic feedback pattern, each designating a series of time intervals indicating at least one of the first haptic feedback or the second haptic feedback of the plurality of haptic feedbacks to be generated in at least one location on the garment.

11. The garment of claim 1, wherein user customization is available via a user interface for at least one of: the first notification sent to the user, the second notification sent to the user, or the plurality of haptic feedbacks delivered to the user.

12. A method comprising:

wirelessly receiving a first coded command, wherein the first coded command indicates a first notification, generated in response to an event of interest, identified based on input data corresponding to a transit of a user;

delivering first haptic feedback to the user via a garment, wearable by the user during the transit, wherein the first haptic feedback corresponds to the first coded command;

detecting a motion that corresponds to one of a plurality of requests via the garment for wireless transmission based on a gesture made by the user;

wirelessly receiving a second coded command, wherein the second coded command indicates a second notification, generated in response to the one of the plurality of requests; and delivering second haptic feedback to the user via the garment, wherein the second haptic feedback corresponds to the second coded command.

13. The method of claim 12, wherein the user is operating a vehicle, and the input data corresponds to at least one of: operation of the vehicle, location of the vehicle, or navigation of the vehicle.

14. The method of claim 13, wherein the vehicle has one or more sensors, and wherein the input data includes data from the one or more sensors.

15. The method of claim 12, wherein the input data includes navigational data, and the first coded command indicates at least one navigational instruction that indicates a turn direction, and wherein the first haptic feedback is delivered to the user in a location of the garment corresponding to the turn direction.

16. The method of claim 12, wherein the event of interest indicates an unsafe situation, and wherein the first coded command indicates the unsafe situation.

17. The method of claim 16, wherein first coded command also indicates instructions for the user to avoid the unsafe situation.

18. An article of manufacture that includes a tangible storage medium that stores operational instructions, that when executed by a processor, causes the processor to:

wirelessly receive a first coded command, wherein the first coded command indicates a first notification, generated in response to an event of interest, identified based on input data corresponding to a transit of a user;

deliver first haptic feedback to the user via a garment, wearable by the user during the transit, wherein the first haptic feedback corresponds to the first coded command;

detect a motion that corresponds to one of a plurality of requests via the garment for wireless transmission based on a gesture made by the user;

wirelessly receive a second coded command, wherein the second coded command indicates a second notification, generated in response to the one of the plurality of requests; and deliver second haptic feedback to the user via the garment, wherein the second haptic feedback corresponds to the second coded command.

19. The article of manufacture of claim 18, wherein the input data includes navigational data, and wherein the first coded command indicates at least one navigational instruction that indicates a turn direction, and wherein the first haptic feedback is delivered to the user in a location of the garment corresponding to the turn direction.

20. The article of manufacture of claim 18, wherein the event of interest indicates an unsafe situation, and wherein the first coded command indicates the unsafe situation.

* * * * *